June 12, 1962     T. R. O'MEARA ET AL     3,039,060
MULTIGRID VACUUM TUBE MULTIPLIERS
Filed June 11, 1957
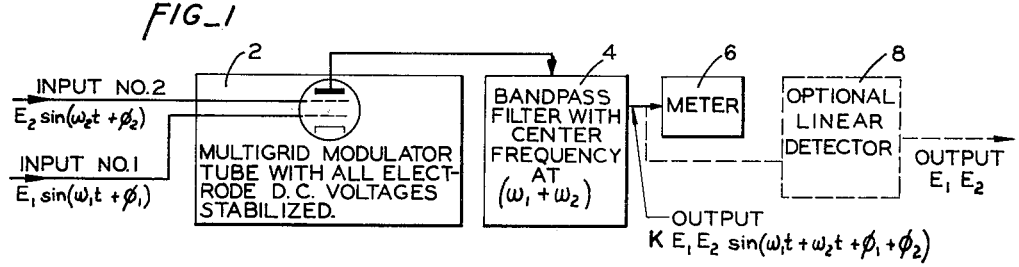
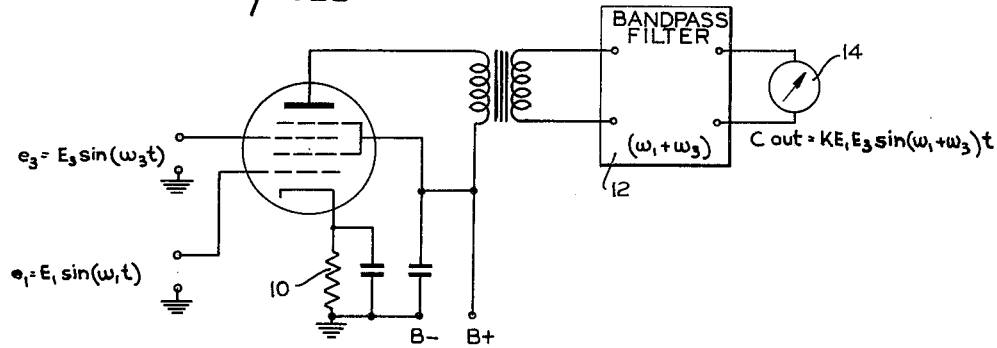
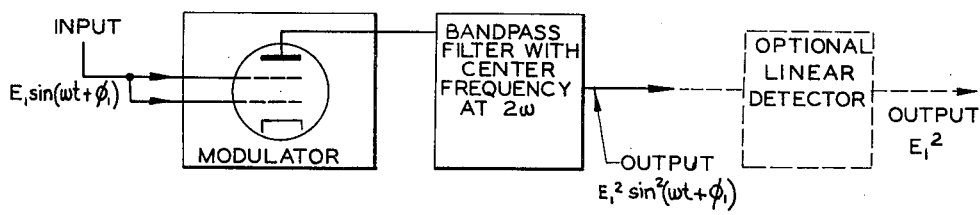
*INVENTORS*
*THOMAS R. O'MEARA*
*RICHARD L. SYDNOR*
BY
ATTORNEYS

United States Patent Office 3,039,060
Patented June 12, 1962

3,039,060
MULTIGRID VACUUM TUBE MULTIPLIERS
Thomas R. O'Meara, Los Angeles, Calif., and Richard L. Sydnor, Champaign, Ill., assignors, by mesne assignments, to the United States of America as represented by the Secretary of the Navy
Filed June 11, 1957, Ser. No. 665,108
3 Claims. (Cl. 328—160)

This invention relates to multipliers and more particularly to multigrid vacuum tube multipliers for multiplying two A.C. signals together.

Although multigrid vacuum tubes have been used in the prior art as multipliers, they have depended on static rather than dynamic characteristics (i.e., a D.C. output rather than a modulated output) and their dynamic range and accuracy has, therefore, been severely limited. Also phase information has been discarded. An object of the present invention, therefore, is to provide a multigrid vacuum tube multiplier which is accurate over a substantial dynamic range and which can be used in effect as a phaser multiplier in the sense that it can preserve the phase information present in the input signal.

Other objects and many of the attendant advantages of this invention will be readily appreciated as the same becomes better understood by reference to the following detailed description when considered in connection with the accompanying drawings wherein:

FIG. 1 is a schematic block diagram showing the essential features of the invention;

FIG. 2 is a more or less schematic diagram showing some of the circuitry of the invention; and FIG. 3 is a schematic block diagram similar to FIG. 1 but showing the invention used as a squarer.

Essentially the invention comprises a multigrid vacuum tube modulator with all electrode voltages stabilized against shifts in D.C. potential, and with two input control grids on each of which is applied one of the signals to be multiplied and which control grids are both operated linearly with respect to plate current (i.e. class A). A filter is located in the plate circuit to eliminate all output components except the desired sideband, for example the upper sideband, which represents the product of the two input voltages. The instantaneous value of the product of the input voltages can be measured by a meter receiving the output of the filter and, if desired, an optional linear detector can be added to give a D.C. output.

Reference is now made to FIG. 1 of the drawing showing in block diagram form a multigrid modulator tube 2, on each of two control grids of which is applied one of the voltages to be multiplied, shown respectively as $E_1 \sin (\omega t + \phi_1)$ and $E_2 \sin (\omega t + \phi_2)$. For illustration purposes only two grids are shown. The particular type of multigrid tube chosen can be any one which has an appreciable region in which each of the two separate plate-current grid-voltage characteristics are linear. A typical acceptable tube would be a 6SA7 using the No. 1 and No. 3 grids. To use the invention, the tube is connected in such a way that there is supplied a D.C. bias, which is stabilized during the operation, to each of the two grids. The operating point of the tube and the bias for each grid can be determined in the following manner. A family of plate current versus No. 3 grid voltage curves is plotted for different fixed D.C. bias voltages on grid No. 1. Equal increments in bias on No. 1 grid are chosen for the adjacent members of this family of curves. The operating point of the tube is chosen by selecting that value for the D.C. bias on No. 3 grid which lies within the region where the aforementioned family of curves is linear and where substantially equal increments of plate current occur as one moves, in a direction parallel to the ordinate (plate current) axis, from a point on one of the family of curves to a corresponding point on each succeeding adjacent curve. In other words, the chosen No. 3 grid bias value will be represented by a line parallel to the ordinate (plate current) axis intersecting all of the aforementioned members of the family of curves. The value of No. 3 grid bias is chosen so that if three adjacent points of intersection are considered, the distance between the first point and the second point is equal to the distance between the second point and the third point. The proper bias voltage for the No. 1 grid is chosen to place the operating point on that curve of plate current versus No. 3 grid voltage which serves to form the central one of these three aforementioned points of intersection. The result of the establishment of this operating point is that if only this selected grid bias and no A.C. volage is applied to the No. 1 grid, then the plate current will vary as a linear function of the voltage on grid No. 3. Similarly, if the aforementioned desired D.C. bias, and no A.C. voltage, is applied to the No. 3 grid, the plate current will vary as a linear function of the voltage on the No. 1 grid.

With the aforementioned grid biases applied to the tube, the tube is now ready to serve as a multiplier. If a voltage $E_1 \sin (\omega_1 t + \phi_1)$ is applied to one grid and a voltage $E_2 \sin (\omega_2 t + \phi_2)$ is applied to the other grid, then the plate current will include a component representing the product of these two voltages $E_1 E_2 \sin (\omega_1 t + \omega_2 t + \phi_1 + \phi_2)$ and if the output from the plate is passed through a bandpass filter, as shown at 4 in FIG. 1, which is tuned to the frequency $(\omega_1 + \omega_2)$ so as to eliminate all other components, then the output of the filter as read by, for example, a meter 6 will be simply $K E_1 E_2 \sin (\omega_1 t + \omega_2 t + \phi_1 + \phi_2)$. The constant K can, of course, be taken account of to yield the simple product. It should be noted that the phase information is preserved in this output and can be observed by any conventional method of comparing it with the phase of an input voltage. In the case where $\omega_1$ and $\omega_2$ are different frequencies, there is no particular problem regarding the maintaining of stabilized D.C. bias voltages on all electrodes because the modulation process in the tube does not produce a sideband which is a D.C. In such a case any conventional type of bias, such as by means of a cathode resistor or the like, can be used, as long as the supply voltage is maintained steady. However, in the event that $\omega_1$ and $\omega_2$ happen to be the same frequency, then one of the sidebands resulting from the modulation is a D.C. component which would, if a cathode resistor, for example, were used for grid bias, change the grid bias and hence the operating point of the tube. Thus if the invention is to be used to multiply two voltages of the same frequency, then independent fixed bias, as from a battery or similar stabilized D.C. bias sources, must be used to maintain stabilized D.C. voltages on all electrodes.

If desired, an optional linear detector 8 can be included to give a D.C. output of magnitude $E_1 E_2$.

In FIG. 2 there is shown a more or less schematic circuit diagram of one embodiment of the invention using a pentagrid converter with the voltages to be multiplied being applied to the No. 1 and No. 3 grids of the tube. In this case, since the input voltages on the two grids are of different frequencies $\omega_1$ and $\omega_3$, respectively, the grid bias is obtained by means of a cathode resistor 10 and no problem of shift in D.C. potentials arises. The output of the tube is applied to a bandpass filter 12 tuned to the frequency $(\omega_1 + \omega_3)$ and the output of the form $K E_1 E_3 \sin (\omega_1 + \omega_3) t$ is read on any suitable meter 14.

A multiplier can be used as a squarer, cuber, or other power law device by simply feeding into its several appropriate inputs the same voltage. In FIG. 3 the present invention is shown being used as a squarer in which the same voltage $E_1 \sin(\omega t + \phi_1)$ is applied to both grids and the output therefore is in the form $E_1^2 \sin^2(\omega t + \phi_1)$. Since the $\sin^2$ term represents a frequency of $2\omega$, the bandpass filter is tuned to that frequency. A cubing device simply extends this principle by feeding the output of the first modulator tube onto one of the two grids in a succeeding tube and feeding the original voltage to the other grid of the succeeding tube. Higher power law devices are made on the same principle.

From the foregoing it is seen that a multiplier has been provided wherein a multigrid vacuum tube is operated in such a manner that the tube serves as a linear modulator with respect to the electrical signals on both inputs. The lower limit on the size of signals which can be multiplied with a high order of precision is determined only, ultimately, by the filtering in the output (to eliminate components at the input frequencies and undesired sidebands), or by the residual tube noise in the output. The upper limit is set by the linearity of modulation which is obtainable with any particular tube.

Obviously many modifications and variations of the present invention are possible in the light of the above teachings. It is therefore to be understood that within the scope of the appended claims, the invention may be practiced otherwise than as specifically described.

What is claimed is:

1. A multiplier comprising an electron tube having at least two grids for controlling the electron stream; means for maintaining substantially stabilized direct current voltages on all electrodes including a substantially stable direct current bias on each of said two grids, the bias on said grids being such as to locate the operating point of the tube in the substantially linear region of each of the respective plate current-grid voltage characteristic curves; means for applying respectively to said two grids two input alternating current voltages to be multiplied together, the magnitude of said alternating current voltages being such as to maintain the operation of the tube within said linear region; and filter means for receiving the output of said tube, said filter means being tuned to pass a frequency equal to the sum of the frequencies of said input voltages.

2. The device of claim 1 further including means for receiving and evaluating the output voltage of said filter means.

3. An apparatus for multiplying together two alternating current voltages comprising a multigrid modulator vacuum tube having at least two control grids; means biasing each of two control grids so that the tube is at an operating point where the plate current varies linearly with each control grid voltage alone; means applying one of said two alternating current voltages to each of said two grids, respectively, the magnitude of each of said alternating current voltages being maintained within such limits that the tube is always operating in the region where the plate current varies linearly with each grid voltage alone; and means filtering the plate output to remove all components except the one at the upper sideband occurring at a frequency equal to the sum of the frequencies of the two input voltages.

References Cited in the file of this patent

UNITED STATES PATENTS

| | | |
|---|---|---|
| 2,074,440 | Usselman | Mar. 23, 1937 |
| 2,490,448 | Lott | Dec. 6, 1949 |
| 2,651,758 | Foster et al. | Sept. 8, 1953 |
| 2,743,421 | Meyer | Apr. 24, 1956 |
| 2,848,161 | Woll | Aug. 19, 1958 |